March 8, 1966 J. P. JONES, JR 3,239,608
ELECTRONIC RECORDER SYSTEMS
Filed Jan. 3, 1964
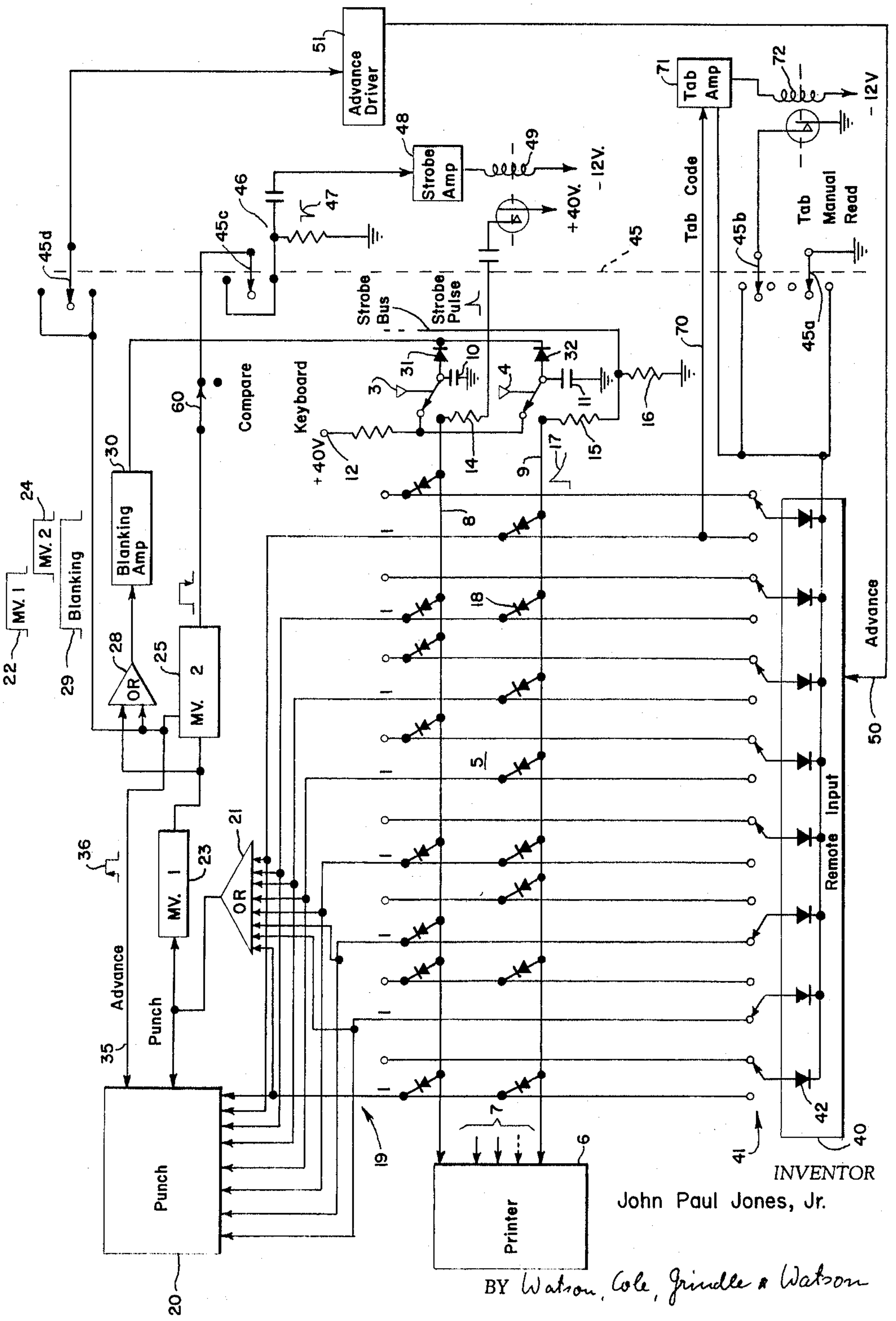
INVENTOR
John Paul Jones, Jr.
BY Watson, Cole, Grindle & Watson
ATTORNEYS 3,239,608
ELECTRONIC RECORDER SYSTEMS
John Paul Jones, Jr., Norristown, Pa., assignor to Navigation Computer Corporation, Norristown, Pa., a corporation of Pennsylvania
Filed Jan. 3, 1964, Ser. No. 335,641
18 Claims. (Cl. 178—26)

This invention relates to electronic recorder systems and more particularly it relates to electronic control circuits for operating recorders responsive to a manually operable keyboard.

In recorders such as punches or printer-punches, which are operated from keyboards, it has been customary to use electro-mechanical systems. These have the great disadvantage over electronic systems that they cannot be modified readily without retooling and thus are extremely inflexible where changes of code characters or control sequences are required for example. In general, it is very difficult to synchronize these devices with external input and output equipment. Also mechanical keyboards are subject to jamming when more than one key is depressed during the operation cycle.

Although electronic systems may be employed to overcome these deficiencies, conventionally they are so complex and expensive that they are not suitable for general usage. Thus the great demand for inexpensive versatile keyboard operated punches has not been resolved adequately.

It is accordingly an object of this invention to provide improved keyboard operated recorder systems.

A further object of the invention is to provide simplified recorder systems which offer versatility of coding and control.

Another object of the invention is to provide a reliable inexpensive electronic recorder system operable from a keyboard and readily synchronizable with external input and output equipment.

A still further object of the invention is to produce improved keyboard operation which eliminates jamming and erroneous operation when a key is depressed while an operation cycle is in process.

Thus, there is provided in accordance with the invention a simplified multiple purpose coding-decoding matrix conversing between appropriate input and output devices. Thus, a keyboard may be used to control a printer and a punch either independently or in conjunction with an external source of input data such as a punch tape reader. This provides flexibility of operations so that different functions may be performed such as preparing punched tape from the keyboard, preparing tapes from external data either independently or with supplemental information from the keyboard and printing as well as punching while matching system timing from either the keyboard the external source with the printer and punch. Thus, a single matrix is used for multiple purposes independently and/or simultaneously in encoding, decoding and comparison functions. Diodes are used to permit simple changes of coding of characters and to give extreme flexibility of system controls and functions. The system operates from a simple synchronous internal mode of timing and control so that operation from the keyboard or external sources may be efficiently accomplished at reasonable speeds. Electronic keyboard controls are blanked during operations where depression of a key could cause error.

These features and other related principles of operation are described in detail with reference to the accompanying drawing which is a schematic representation of a recorder system embodying the invention.

Representative of a full keyboard are manually operable keys 3 and 4 which are provided for each character and auxiliary control functions as needed. These keys provide a "one out of *n*" code such as decimal or alphanumeric conventionally used in typewriters and calculating machines. Thus, the horizontal lines on the matrix 5 represent one out of *n* code lines which may operate for example an output printer 6. This could be a conventional electrically controlled typewriter of any other device controlled by impulses arriving at any one of *n* input leads 7.

Thus, the keyboard supplies voltage impulses when keys 3 or 4 are closed to contact the matrix lines 8 and 9 respectively. Capacitors 10 and 11 are charged to about 40 volts from the source at terminal 12 when the keys are in their normally inoperated position shown. When a key is closed it discharges the respective capacitor through one of separate resistors 14, 15 and the common resistor 16 to produce at the matrix lines 8 or 9 a differentiated voltage spike or impulse 17 of a duration chosen by the R-C time constant of the discharge circuit.

Matrix 5 has unilaterally conductive diodes 18, etc. coupled to vertical output lines 19 to establish code conversion from one out of *n* code to binary code. Thus line 9 is connected for the binary coded character 10011111 reading from the leftmost output line. A pulse 17 on line 9 thus is transmitted through diodes 18 etc. to the respective coded lines which serve as input leads for setting up the corresponding code in a conventional binary coded paper tape punch recorder 20 for example.

All the binary coded axis matrix lines are coupled with OR circuit 21 to provide an operation or timing pulse for control of the recorder system. Thus for example the punch cycle is initiated in punch 20 and a control waveform 22 is initiated in multivibrator 23. This is succeeded by waveform 24 sequentially produced in multivibrator 25. These two waveforms 22 and 24 constitute the entire timing control signals necessary in addition to the initial pulse derived from the matrix 5. By way of example, the multivibrators 23 and 25 may produce 50 millisecond pulses for a total cycle time of 100 milliseconds. Thus, the system may punch or print at ten characters per second.

Both of the pulses 22, 24 are mixed at OR circuit 28 to produce blanking pulse 29 over the entire operation cycle from initiation of the initial keyboard pulse 17. Thus blanking amplifier 30 serves to discharge capacitors 10 and 11 through diodes 31, 32 for the entire operating cycle. Accordingly as soon as the first key is depressed all other keys are locked-out until the cycle is over so that errors may not be introduced by closure of the keys at any time while the cycle is in process.

In this manner the matrix 5 serves as an encoding matrix for operating the punch 20 from the keyboard by use of fan-out diodes 18, etc., and the depression of any key starts the print and punch cycle in operation. If the punch 20 is not timed directly from input data at lines 19, it has a punch command initiated from the impulse at any vertical output line 19 via OR circuit 21, to start the punching cycle for information set up at output lines 19. The punch is advanced for any keyboard signal even if codes are not presented on lines 19, so that a sprocket hole is punched and the tape is advanced after the punching cycle by a signal at advance lead 35. Waveform 36 from multivibrator 25 has an arrow at the leading edge to signify derivation of a control signal to advance the tape in punch 20 during the second 50 millisecond period 24. It is then ready to receive a further input punching command.

Tapes may be punched from external data supplied the matrix 5 from the remote input device 40. This device may supply binary coded input information to the vertical matrix lines 19 by way of a series of transfer contacts 41, which may be set to the left for binary "0" and to the right for binary "1." Thus the code 1001111 is set up in the switches 41 as shown in a representative code grouping. Wherever the switch section 41 is to the left vertical matrix line 19 is grounded so the pulses cannot set up the punch code. The remote input device may typically be a punched paper tape reader having a tape which is to be duplicated at punch 20. Mixing diodes 42 are used to isolate the vertical matrix lines 19.

Consider a read mode of operation which may be established in the lower position of gang switch 45. This sets up input data for punch 20 by grounding appropriate output lines 19 through section 45*a* of the switch. Section 45*c* of the switch couples a differentiating circuit 46 to the multivibrator 25 to use the trailing edge of waveform 24 for deriving an automatic read strobe pulse 47 through amplifier 48 and relay 49. This feedback signal is supplied by contacts of relay 49 to the common resistor 16, strobe bus and resistors 14, 15 to all horizontal matrix lines, thereby to initiate a new cycle as soon as one line has the correct code set up in remote switches 41. The first cycle is initiated by the closure of switch 45*c* to time constant circuit 46, from the normally negative output of the second timing $MV_2$.

In the read mode of operation, the remote input data is advanced at lead 50 from signals derived through switch section 45*d* from the leading edge of the pulse 24, so that the punch 20 and remote unit 40 are both advanced during the second half of the operation cycle. Advance driver circuit 51 is shown for this purpose. Thus, the entire read cycle may be automatic until a stop code such as 00000000 is read by the remote unit 40 which blocks the recycle pulses 47 at all horizontal lines of the matrix 5 by grounding all the lines 19 through diodes 18 etc.

The remote input device 40 also serves through matrix 5 to encode printer 6 which operates on the one out of *n* coding at horizontal lines 8, 9, etc. Thus, both "0" and "1" are encoded by transfer switches 41 to provide the code and its complement. The complement code is coupled only to the horizontal matrix lines. In the shown example, when the input code matches that on any one horizontal line such as 9 all the diodes are ungrounded, so that the impulse 47 may pass to the appropriate code line in printer 6. In this function the diodes serve as an AND gate with pull-up resistors 14, 15 rather than as fan out unilateral coding diodes. In this manner the matrix 5 may be used for more than one function simultaneously.

Accordingly, the keyboard and remote unit 40 may be used simultaneously in editing or comparing information in a proofreading operation. For this compare operation switch 60 opens the initiation signal line in the read operation position of switch 45, and initiation pulses come from the keyboard. Assume key 4 is closed, and all the diodes 18 etc. on line 9 are ungrounded by comparison with switches 41. Then the key operates the punch 20 and in turn advances the next character into the remote input unit 40. However, should a different character be manually chosen, such as key 3, it will find some diodes grounded in line 8 and will not provide the initiation impulse for punch 20 and the timing multivibrators 23 and 25, so that nothing happens and the operator may sense a mistake and find out where it occured for correction.

A further mode of operation provided by switch 45 is that of tabulation. This is used for automatic letter writing, or the like where prepared text is printed or punched until manual insert of address, etc. is desired. For the simplest case assume that the remote code is the tab code taken on line 70 to operate amplifier 71 and relay 72. When switch 45 is in the upper tab position, section 45*a* provides a ground circuit to enable the remote unit 40 only whenever a tab code is not present. Sections 45*c* and 45*d* provide automatic advance of remote information until the tab code arrives. At that time, the control is with the keyboard and switch 45 may be set to the manual position, if more than one external character is desired before the remote unit 40 is called upon again for more input data.

It is therefore evident that a simple versatile recording system is afforded by the invention having those features of novelty defined in the following claims.

What is claimed is:

1. In a keyboard operated recording system the combination comprising, a first display device operable from a first plurality of lines to display corresponding characters in one out of *n* code form, a plurality of manually operable input key switches presenting a series of characters in one out of *n* code connected to said first plurality of lines to produce input information for the display device, an auxiliary source of input information presenting on a series of switches a series of characters in binary coded form, a second display device with a second plurality of lines coupled to said switches for displaying characters in binary coded form, said first and second plurality of lines forming a matrix, and unilaterally conducting coding elements in the matrix coupling selected ones of the binary lines of one matrix axis to selected ones of the one out of *n* lines of the other matrix axis thereby providing relative coded paths between the appropriate input and output devices to converse simultaneously in one out of *n* code and binary code from both the respective input switches to both the output devices.

2. A combination as defined in claim 1, wherein a potential source is coupled to the keys for introduction of an impulse into the matrix as the keys are manually operated, a time delay device is provided responsive to said impulse presented on any one of the matrix binary lines for generating a signal over a time period $t$ when any one of the keys is operated, and means responsive to the signal is operable to inactivate said impulse during the time delay so that only one key may operate the matrix during any one time period produced by the time delay device.

3. A combination as defined in claim 1 wherein the auxiliary source presents information in binary code digits on the binary axis of the matrix and therefore to said second device, and further presents complementary digits in further unique coded paths to corresponding matrix lines of the one out of *n* axis, and means transmitting a pulsed signal through the one out of *n* axis matrix lines to operate both said display devices coupled to that single coded line which has all matrix paths coded.

4. A combination as defined in claim 3 wherein switching means is provided to establish different operating modes by enabling the auxiliary source to introduce information into the matrix, and coupling said pulsed signal to the one out of *n* axis matrix lines in one mode permitting the reading of information from the auxiliary source.

5. In a keyboard operated recorder the combination comprising, a plurality of manually operable keys representing a series of characters in one out of *n* code to produce input information for the recorder, an auxiliary source of input information for the recorder presenting a series of characters in binary coded form, a first device for displaying characters in one out of *n* code, a second device for displaying characters in binary coded form, and a matrix coupling the two binary devices to lines of one matrix axis and the two "one out of *n*" devices to lines on the other matrix axis and providing relative coded paths betwen the appropriate input and output devices to converse in one out of *n* code and binary code between the respective input and output devices wherein the matrix provides coded information paths from each key input line in the matrix to a unique group of binary output lines thereby, presenting the one out of *n* key code in binary code form at said second device, the auxiliary source presents information in binary code digits on the binary axis of the matrix and therefore to said second device, and further presents complementary digits in further unique coded paths to corresponding matrix lines of the one out of *n* axis, and means transmitting a pulsed signal through the one out of *n* axis matrix lines to operate both said display devices coupled to that single coded line which has all matrix paths coded, switching means is provided to establish different operating modes by enabling the auxiliary source to introduce information into the matrix, and coupling said pulsed signal to the one out of *n* axis matrix lines in one mode permitting the reading of information from the auxiliary source wherein time delay means is provided for generating a signal over a time period *t* responsive to both operation of one of the keys and operation of the auxiliary source when introducing input characters into the matrix, and a signal is derived from the time delay means for causing the auxiliary source to sequentially present a series of characters automatically.

6. A combination as defined in claim 5 wherein a potential source is coupled to the keys for introduction of an impulse into the matrix as the keys are manually operated, and means responsive to the delay means during the time period *t* for inactivating the impulse so that only one key may operate the matrix during any one time period *t*.

7. A combination as defined in claim 5 wherein the switching means provides a tabulation made of operation by connecting means coupling a chosen tabulation code derived from the matrix to selectively enable the auxiliary source, whereby the auxiliary source is disenabled upon presentation of a non-tab code and the keys remain active for receipt of further input information.

8. A combination as defined in claim 7 wherein selective means for providing a comparison mode of operation is included comprising means for selectively advancing input information from the auxiliary source into the matrix while the keyboard is operable, and introducing the impulse from the keyboard through that unique code path which is produced by the information presented by the auxiliary source.

9. A combination as defined in claim 8 wherein the coded information paths comprise unilateral conductors coupled betwen lines on different axes of the matrix.

10. An input-output device comprising in combination, a diode matrix connected to provide one out of *n* code on lines of one axis and binary code on lines of the other axis, selectively operable keys conncted to the lines on the one out of *n* axis, binary display means coupled to the lines on the binary axis, one out of *n* display means coupled to the lines on the one out of *n* axis, capacitor means providing an impulse from operation of any one key which initiates operation of both display means charging the capacitor, means coupled to receive from any one line on one of the matrix axes, said impulse to generate a signal over a time period *t*, and means responsive to said signal for discharging the means for providing the impulse during the period to thereby prevent operation of the display means responsive to operation of more than one key during the period *t*.

11. An input-output device comprising in combination, a diode matrix connected to provide one out of *n* code on lines of one axis and binary code on lines of the other axis, selectively operable keys connected to the lines on the one out of *n* axis, binary display means coupled to the lines on the binary axis, one out of *n* display means coupled to the lines on the one out of *n* axis, means providing an impulse from operation of any one key which initiates operation of both display means, an auxiliary binary input device selectively coupled to the lines of the binary axis, coding diodes coupled in the matrix for binary "0" bits as well as binary "1" bits to provide a unique coded path a single "one out of *n*" line, means responsive to said impulse to generate a signal over a time period *t*, and means responsive to said signal to produce a further impulse on said one out of *n* matrix lines to provide automatic readout from said auxiliary device.

12. The device defined in claim 11 including means to present further binary coded characters from the auxiliary device responsive to said signal thereby automatically reading information from the auxiliary device.

13. The device defined in claim 12 including means for selectively coupling the auxiliary device to the matrix responsive to at least one selected tabulation code resident in the matrix whereby the auxiliary device stops automatically for presentation of information from said keys.

14. The device defined in claim 12 including selectively operable means for introducing information into the matrix from the keyboard to operate the display devices when identical with the information presented by the auxiliary device.

15. A keyboard operated printer-punch system comprising in combination, a keyboard having a plurality of switches each for designating one of a series of characters, a set of input terminals for presenting a sequence of signals representing characters in binary coded form, a printer for reproducing the individual characters responsive to both the switches and signals, a paper tape punch responsive to both the switches and signals for reproducing a binary coded record of the input data, an encoding matrix coupling the switches and signals on two axes respectively to the printer and punch by conductive circuit connections and cross connecting the printer and punch respectively to the signals and switches through encoding circuits, and means initiating an operation cycle of the printer and punch responsive to both the switches and signals.

16. A system as defined in claim 15, wherein means inactivates the switches and signals during the operation cycle thereby preventing use of the switches to initiate a cycle until the preceding cycle is completed which latter means includes time delay means providing a timing signal with duration corresponding to the operation cycle, and electronic means responsive to the termination of the timing signal to initiate a new operation cycle.

17. A keyboard operated system comprising in combination, a keyboard having a plurality of switches each designating one of a series of characters, an electronic system operable to process information responsive to operation of any single keyboard switch during an operation cycle, a source of power coupled to said switches in the keyboard, means initiating an operation cycle in said system responsive to momentary operation of any keyboard switch to couple power from said source into said electronic system, means generating an electronic waveform with a time duration corresponding to that of said operation cycle, and electronic switching means decoupling the source of power from all the keyboard switches for the duration of said waveform to thereby assure the processing of information in the system for only one character during each operation cycle.

18. The system defined in claim 17 wherein each keyboard switch includes a capacitor coupled to receive power from said source and to produce the power coupled from the source into the system.

References Cited by the Examiner

UNITED STATES PATENTS

| | | | |
|---|---|---|---|
| 2,749,484 | 6/1956 | Levitt | 178—26.5 |
| 2,936,111 | 5/1960 | Bindel | 340—166 |
| 2,959,775 | 11/1960 | Marcus | 178—26 |
| 2,969,533 | 1/1961 | Shanahan | 340—166 |
| 3,015,088 | 12/1961 | Bower | 340—147 |
| 3,057,955 | 10/1962 | Hirsch | 178—26 |
| 3,175,189 | 3/1965 | Willyard et al. | 340—147 |

References Cited by the Applicant

UNITED STATES PATENTS

| | | |
|---|---|---|
| 2,840,216 | 6/1958 | Larson et al. |
| 2,869,703 | 1/1959 | Hebel. |
| 2,891,649 | 6/1959 | Peterson. |
| 2,942,253 | 6/1960 | Peterson. |

NEIL C. READ, *Primary Examiner.*

T. A. ROBINSON, *Assistant Examiner.*